(12) United States Patent
Jia et al.

(10) Patent No.: US 8,412,360 B2
(45) Date of Patent: Apr. 2, 2013

(54) METHOD AND SYSTEM FOR ROBUST ATTENUATION OF MECHANICAL RESONANCES USING A MULTI-RATE LOW PASS FILTER

(75) Inventors: Qing Wei Jia, Singapore (SG); Kensuke Amemiya, Singapore (SG)

(73) Assignee: Hitachi Asia Ltd., Hitachi Square (SG)

( * ) Notice: Subject to any disclaimer, the term of this patent is extended or adjusted under 35 U.S.C. 154(b) by 376 days.

(21) Appl. No.: 12/861,301

(22) Filed: Aug. 23, 2010

(65) Prior Publication Data
US 2012/0046763 A1 Feb. 23, 2012

(51) Int. Cl.
*G05B 11/01* (2006.01)
*G11B 5/596* (2006.01)

(52) U.S. Cl. .................. 700/71; 700/55; 360/77.02

(58) Field of Classification Search ............ 700/55, 700/71; 360/77.02, 77.04, 77.08; 369/44.27
See application file for complete search history.

(56) References Cited

U.S. PATENT DOCUMENTS

| | | | |
|---|---|---|---|
| 5,083,304 A * | 1/1992 | Cahill | 375/345 |
| 5,377,096 A | 12/1994 | Ono | |
| 6,014,285 A | 1/2000 | Okamura | |
| 6,219,196 B1 | 4/2001 | Semba | |
| 6,274,994 B2 | 8/2001 | Tsutsui | |
| 6,690,534 B2 | 2/2004 | Ding | |
| 6,710,965 B2 | 3/2004 | Ding | |
| 6,741,914 B1 | 5/2004 | Tze Ming Pang | |
| 6,927,934 B2 | 8/2005 | Atsumi | |
| 6,970,321 B2 | 11/2005 | Hsin | |
| 7,016,142 B2 | 3/2006 | Jung | |
| 7,292,001 B2 * | 11/2007 | Sato et al. | 318/623 |
| 7,327,103 B1 * | 2/2008 | El-Sadi | 318/34 |
| 7,340,007 B2 * | 3/2008 | Liu | 375/297 |
| 7,474,494 B2 * | 1/2009 | Atsumi et al. | 360/77.08 |
| 7,538,964 B2 | 5/2009 | Kisaka | |
| 8,159,775 B2 * | 4/2012 | Armendariz et al. | 360/79 |
| 2008/0204138 A1 * | 8/2008 | Yang et al. | 330/258 |

* cited by examiner

Primary Examiner — Dave Robertson

(74) Attorney, Agent, or Firm — Occhiuti Rohlicek & Tsao LLP

(57) ABSTRACT

A system for a providing a multi-rate digital low pass filter that attenuates high frequency resonances in a control signal. The filter described by a transfer function having a phase-advanced factor (or an approximation of phase-advanced factor) and a low pass filtering function; either cancels or avoids an unstable pole in the phase advanced factor at $z=-1$.

13 Claims, 19 Drawing Sheets

METHOD AND SYSTEM FOR ROBUST ATTENUATION OF MECHANICAL RESONANCES USING A MULTI-RATE LOW PASS FILTER

FIELD OF DISCLOSURE

This invention relates to a digital signal processor that generates control signals for a plant. More particularly, this invention relates to a digital signal processor that implements a multi-rate digital low pass filter to attenuate high frequencies introduced into a control signal from mechanical resonances. Still more particularly, this invention relates to a multi-rate digital low pass filter described by a transfer function having a phase-advanced factor (or a stable approximation of phase-advanced factor) and a low pass filtering function.

BACKGROUND

In today's society, many devices include a controller that generates a control signal that controls movement and/or operation of another component of a device. One example of such a device is a hard disk drive (HDD). In a typical HDD, data is stored on a circular disk. Heads for reading and writing are located on an arm that is positioned over the disk. A track servo system moves the arm over the disk to position the heads over a particular portion of the disk for reading and/or writing of data from/to that portion of the disk as the disk is rotated by a motor. A controller generates control signals that are transmitted to the servo system to position the arm over the disk to read and/or write desired data.

As technology has advanced, HDDs have become smaller and smaller and included in more devices. As the HDDs have become smaller, it is a problem that the servo systems in HDDs are required to hold read/write heads to very small off-track errors to support the increasing track density of disks. Tracking errors can be induced due to many effects including disk and bearing run-out; servo-track-writer induced irregularities; electronic noise; spindle and actuator resonances; and external shock and vibration excitations. The tracking errors cause noise in the control signal applied to the servo system by the controller. The controller monitors the signal applied to the plant to correct the signal to account for the noise added by these tracking errors.

Typically, the tracking errors induced by disk and bearing run-out; servo-track-writer induced irregularities; electronic noise; and spindle and actuator resonances cause high frequency noise in the control signal. Thus, the controller must adjust the control signal to remove this noise.

It is well know to use carefully designed notch filters to attenuate mechanical resonances, such as the spindle and actuator resonances. In order to attenuate the mechanical resonance the notch filter must have center frequencies that follow the shift frequency of the mechanical resonance. However, designing such a notch filter is difficult due to the variation in resonance frequencies in individual drives caused by variations of mechanical components and the manufacturing process. Alternatively, the notch filter may be designed to have a wide range of attenuation. However, the wide range of attenuation leads to phase loss in the signal. Another problem with the use of notch filters is that mechanical resonances often have multiple resonant modes. Thus, multiple notch filters are needed to filter out the multiple modes. The use of multiple notch filters significantly affects the stability margins of the signal, makes design of the filters more complicated and requires more code space to implement the multiple filters.

To overcome the problems with the use of notch filters to attenuate mechanical resonances, U.S. Pat. No. 6,710,965 titled "Phased-Advanced Filter for Robust Resonance Cancellation" in the name of Ding et al. issued 23 Mar. 2004 discloses the use a phase-advanced low pass filter to attenuate mechanical resonances. The proposed filter is a low pass filter with a transfer function that includes either (z+1) in the numerator of the transfer function. By replacing (z+1) with 2z in the numerator of the filter causes the phase of the filter to advance by $wT_s/2$, where $T_s$ is the sampling period. However, the amplitude of 2z is much larger than the amplitude of (1+z). Thus, the magnitude of the phase-advanced filter will be amplified at a high frequency range. Thus, there is a need in the art for a low pass filter that can significantly attenuate multiple mechanical resonances from a control signal that is not unacceptably amplified at a high frequency range.

SUMMARY OF THE INVENTION

The above and other problems are solved and an advance in the art is made by the provision of a system and method for attenuating mechanical resonances using a multi-rate digital low pass filter in accordance with this invention. A first advantage of a system in accordance with this invention is that the multi-rate digital low pass filter has more robust resonance cancellation capability and lower or comparable phase loss than a notch filter. Thus, the use of a multi-rate digital low pass filter of this invention is better able to handle variations of resonance frequencies. A second advantage of a system in accordance with this invention is that a multi-rate digital low pass filter in accordance with this invention is easy to implement using computer software without affecting the hardware design and manufacturing costs. A third advantage in accordance with this invention is that the multi-rate digital low pass filter in accordance with this invention requires less memory to implement in a digital signal processor. Thus, a system in accordance with this invention may be incorporated into a digital signal processor that has minimal memory for storing instructions.

In accordance with embodiments of this invention, a system for attenuating mechanical resonances from a control signal includes a digital signal processor. The digital signal processor receives a control signal from a plant that has been converted from an analog signal to a digital signal by an analog-to-digital converter. A multi-rate digital low pass filter implemented by the digital signal processor is then applied to a sample of the digital signal to remove high frequency resonances. The multi-rate digital low pass filter is described by a transfer function having a low pass filtering function and a phase-advanced factor having an unstable pole at $z=-1$. The transfer function may include a phase-advanced factor if the low pass filtering function has a zero at $z=-1$ that cancels the unstable pole. But in many cases, there is no zero at $z=-1$ in the low pass filtering function. In such cases, an approximation of the phase-advanced factor is used to avoid the unstable pole.

In accordance with some embodiments of this invention, the multi-rate digital low pass filter cancels the unstable pole at $z=-1$ by providing a zero at $z=-1$ in the low pass filtering function. In accordance with other embodiments of this invention, the multi-rate digital low pass filter provides a stable approximation factor to handle the unstable pole at $z=-1$.

In embodiments of this invention, the transfer function of the multi-rate digital low pass filter is:

$$\frac{b_0 + b_1 z^1 + \ldots + b_m z^m}{a_0 + a_1 z^1 + \ldots + a_n z^n} \left(\frac{2z}{1+z}\right)^l \quad (1)$$

where n−m>0, l≧1 and n,m,l are integers;

$$\left(\frac{2z}{1+z}\right)^l$$

is the phase-advanced factor;

$$\frac{b_0 + b_1 z^1 + \ldots + b_m z^{m^l}}{a_0 + a_1 z^1 + \ldots + a_n z^n}$$

is the digital low pass filtering function; and $a_0$ through $a_n$ and $b_0$ through $b_m$ are low pass filter constants.

BRIEF DESCRIPTION OF THE DRAWINGS

The above and other features and advantages of this invention are described in the following detailed description and are shown in the following drawings.

DETAILED DESCRIPTION OF THE INVENTION

This invention relates a digital signal processor that generates control signals for a plant. More particularly, this invention relates to a digital signal processor that implements a multi-rate digital low pass filter to attenuate high frequencies introduced into a control signal from mechanical resonances. Still more particularly, this invention relates to a multi-rate digital low pass filter described by a transfer function having a phase-advanced factor (or a stable approximation of phase-advanced factor) and a low pass filtering function.

Figure 1:
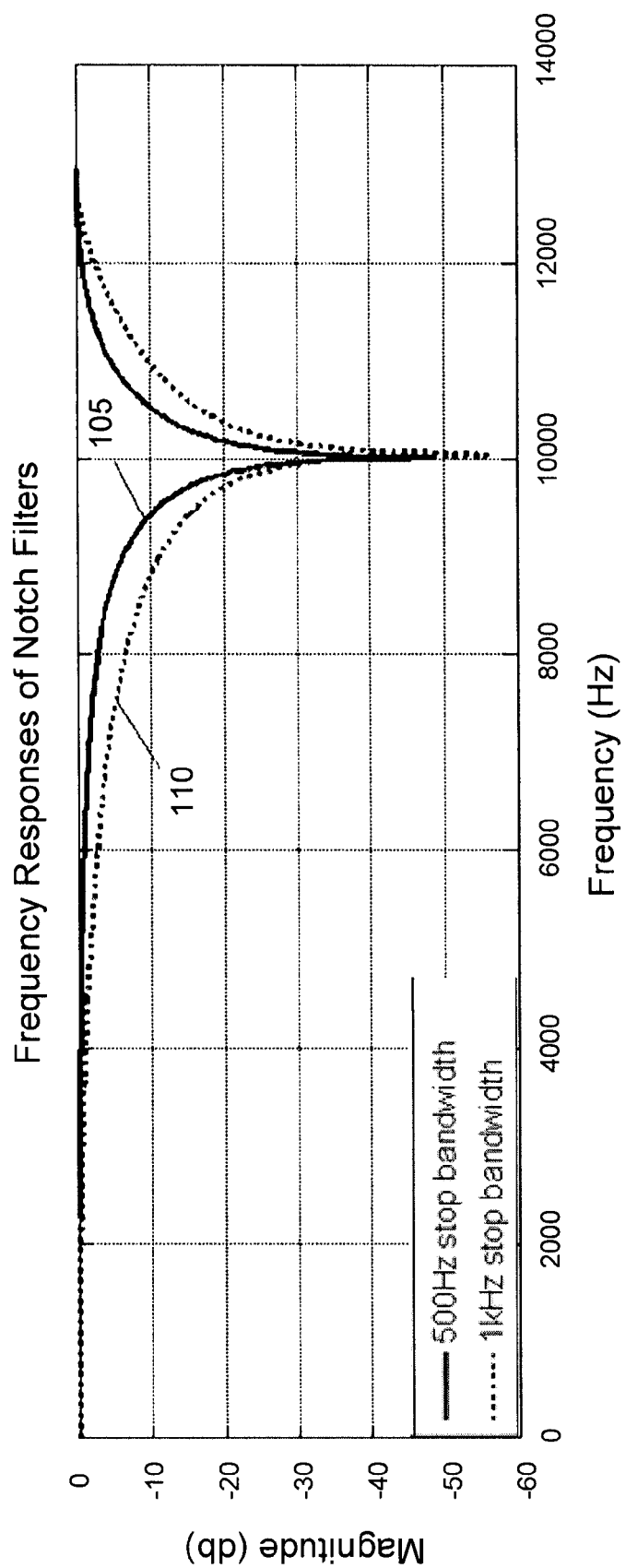
FIG. 1, illustrating a graph of the amplitude of frequency responses of an embodiment of a prior art notch filter for attenuating mechanical resonances.
Figure 2:
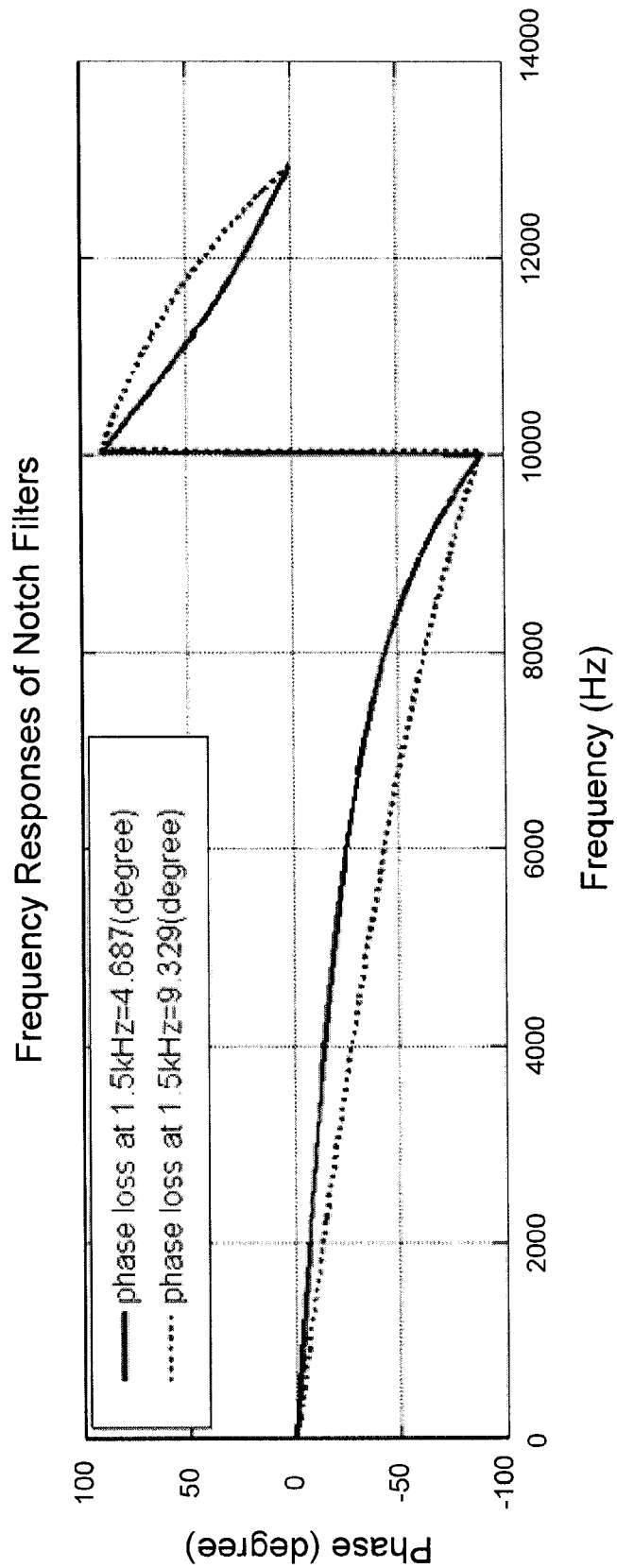
FIG. 2, illustrating a graph of the phase of frequency responses of an embodiment of the prior art notch filter described with regards to FIG. 1.

In the prior art, notch filters are commonly used to attenuate unwanted mechanical resonances from the control signal. To attenuate mechanical resonances at different frequencies, the notch filters used must have enough bandwidth to handle variance in the resonance frequencies. However, phase delay increases as the bandwidth is increased. FIGS. 1 and 2 illustrate a graph of the amplitude and phase responses of two prior art notch filters with two different bandwidths to show that phase loss increases as bandwidth increases.

In FIG. 1, line 105 illustrates the amplitude response of a notch filter having a stop bandwidth of 500 Hz centered at a mechanical resonance mode of 10 kHz that provides at least −15 dB attenuation in the stop bandwidth. Line 110 illustrates the magnitude of the amplitude response of a notch filter having a stop bandwidth of 1 kHz centered at a mechanical resonance mode of 10 kHz that provides at least −15 dB attenuation in the stop bandwidth. The phase delay of each of the 500 Hz and 1 kHz notch filters are shown in FIG. 2. In FIG. 2, the phase delay of the 500 Hz notch filter is shown by line 205 and the phase delay of the 1 kHz notch filter is shown by line 210. At frequency 1.5 kHz, the phase delay for the 500 Hz notch filter is 4.687 degrees and the phase delay for the 1 kHz notch filter is 9.329 degrees. Furthermore, as the frequency increases, the phase delay of the 1 kHz notch filter increases at a greater rate than the 500 Hz notch filter. Thus, one skilled in the art will recognize that as the stop bandwidth of a notch filter widens, the amount of phase delay increases. Thus, notch filters are not a preferable manner in which to attenuate the mechanical resonances from a plant.

Figure 3:
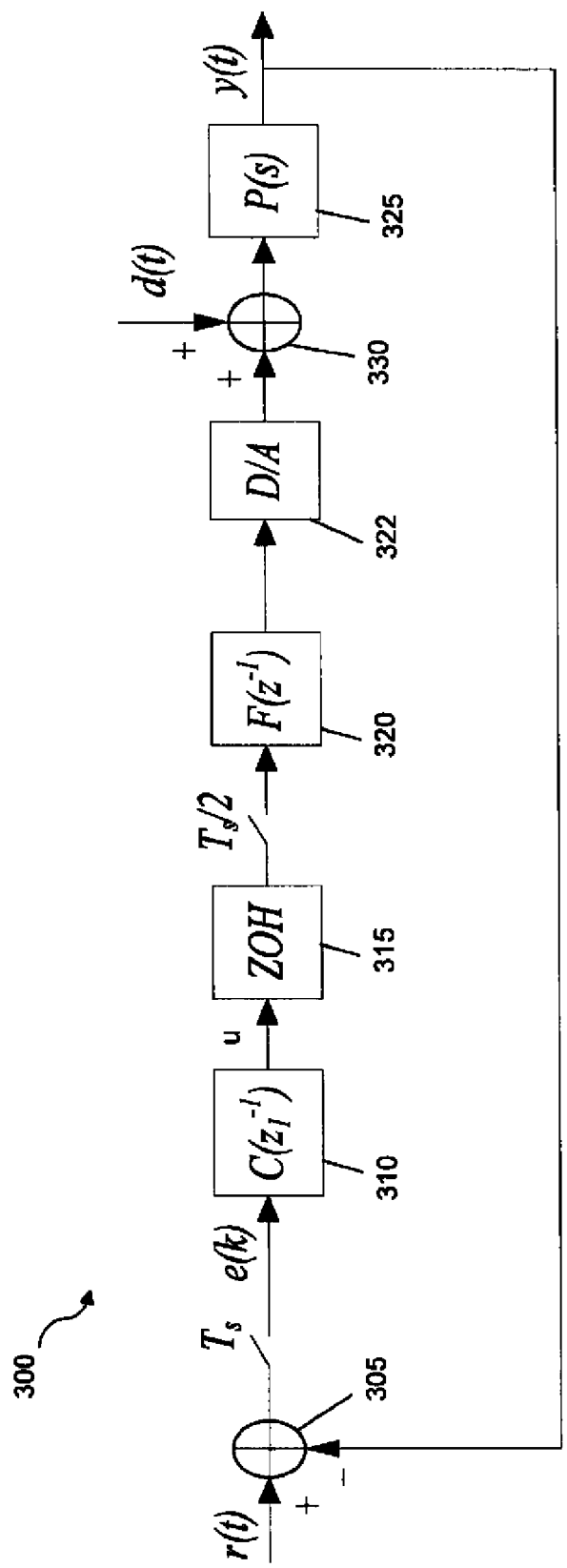
FIG. 3, illustrating a servo loop for generating a control signal for a plant in accordance with an embodiment of this invention.

In accordance with this invention, a multi-rate digital low pass filter replaces the notch filter to attenuate the high frequency mechanical resonances. In embodiments of this invention, a digital signal processor generates a control signal for a plant based upon previous control signals applied to the plant, such as a disc drive. The digital signal processor provides a multi-rate digital low pass filter that attenuates high frequency resonances such as resonances introduced by mechanical components of the disc drive. FIG. 3 illustrates servo loop 300 for providing a control signal to the plant. One skilled in the art will recognize that servo loop 300 may be implemented as instructions performed by a digital signal processor or a combination of instructions performed by a digital signal processor and other circuitry without departing from this invention. One skilled in the art will recognize that other components and/or functions may be added to servo loop 300 without departing from this invention.

Servo loop 300 includes a control signal generator 310 that generates a control signal, u, from a reference signal r(t) and a sample of the control signal previously applied to plant 325, which is the Position Error Signal (PES) that is output from mixer 305. Control signal generator 310 is preferably provided by instructions executed by a digital signal processor to provide a function, $C(z_1^{-1})$ for generating a control signal through digital means. The exact details of the function of control signal generator 310 are omitted for brevity, as the workings and components of control signal generator 310 are not important for understanding this invention.

Multi-rate digital low pass filter 320 receives control signal from zero-order-hold 315 and attenuates high frequency disturbances from the digital control signal. Examples of high frequency disturbance signals are resonances introduced by mechanical components of the system. The digital control signal filtered by multi-rate digital low pass filter 320 is then applied to digital-to-analog converter 322 that converts the digital signal into an analog signal. Representative mixer 330 is not physically part of servo loop 300. However, representative mixer 330 is provided to show that the output control signal y(t) is subjected to the introduction of high frequency disturbance signals, d(t) introduced by the resonances of mechanical components in the systems. The control signal including the added disturbance signals is applied to plant 325. Plant 325 then performs a function in accordance with the received error signal. The actual workings of plant 325 are omitted for brevity as an understanding of the workings of plant 325 is not important for this invention. The control signal applied to plant 325 is output as y(t) for use by controller 310 in generating the control signals In accordance with this invention, multi-rate digital low pass filter 320 has a transfer function having a phase-advanced factor with 2z in the numerator and a factor of (1+z) in denominator. Thus, the low pass filter in a system in accordance with this invention is different from the low pass filters that have been proposed in prior art. In particular, multi-rate digital low pass filter 320 in accordance with this invention cancels out an unstable pole at z=−1 when there is a zero at z=−1 in the low pass filtering function. Otherwise, a stable approximation of phase-advanced factor is used to handle the unstable pole.

Figure 4:
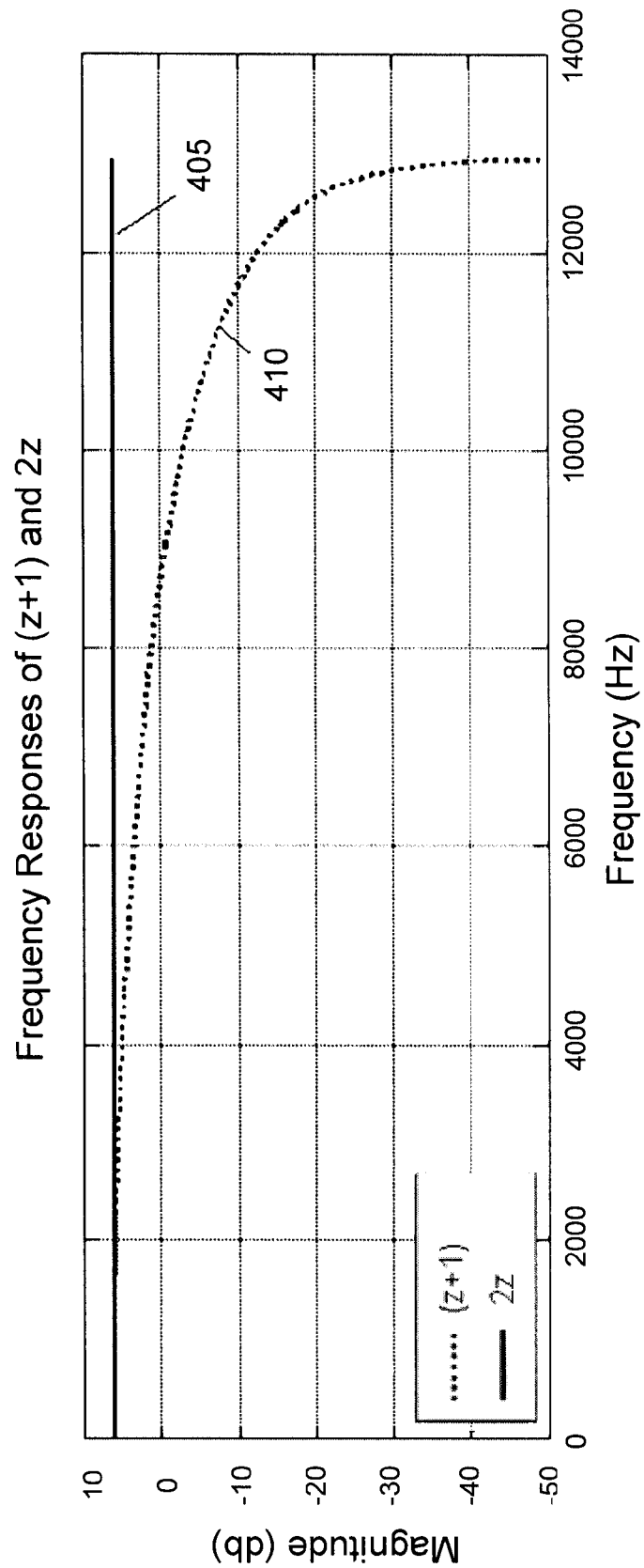
FIG. 4, illustrating a graph of the amplitude of frequency responses of prior art low pass filters.
Figure 5:
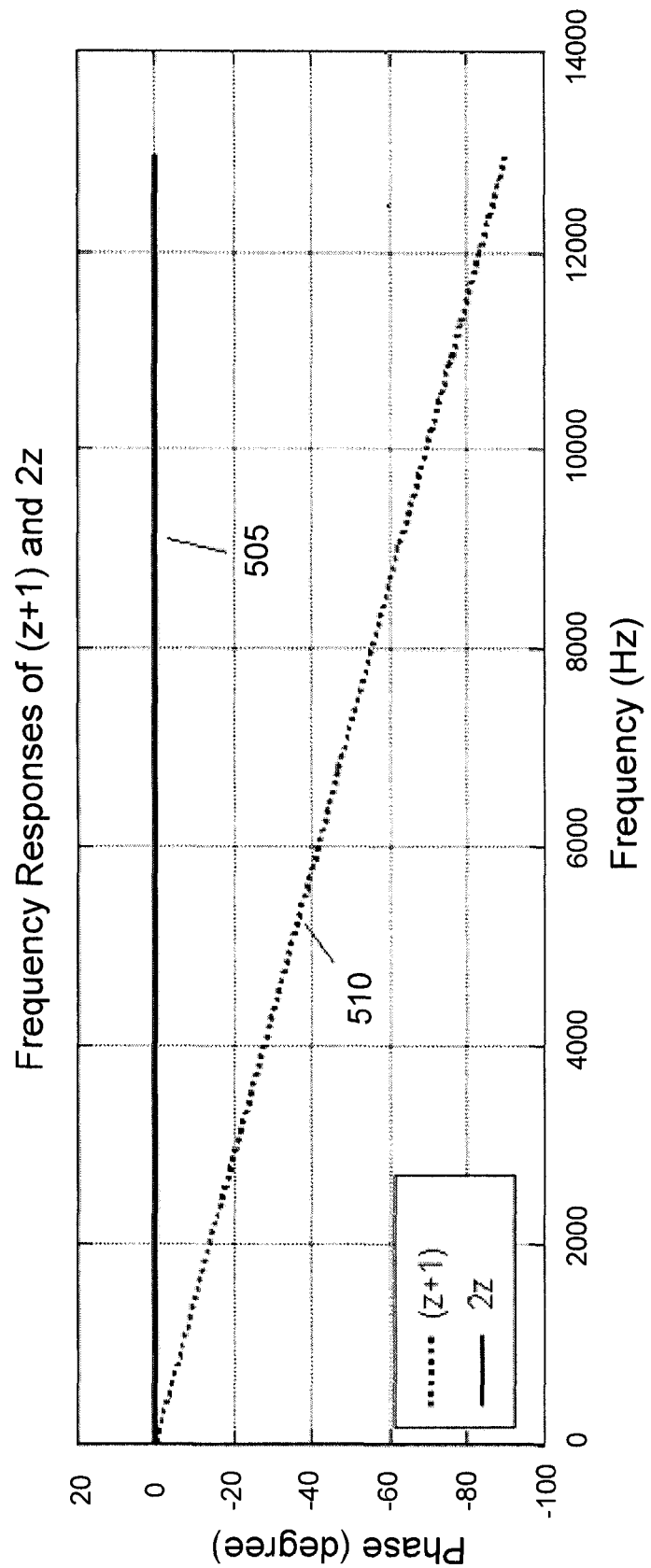
FIG. 5, illustrating a graph of the phase of frequency responses of prior art low pass filters.

In the past, others have proposed low pass filters for use in attenuating mechanical resonances. In particular, U.S. Pat. No. 6,710,965 titled "Phase-Advanced Filter for Robust Resonance Cancellation" in the name of Ding et al. issued 23 Mar. 2004 ('965 patent) describes a phase-advanced digital filter designed to handle the phase delay problem. The '965 patent describes a strictly proper digital filter that has a transfer function with a factor of (z+1) in the numerator. Further, the '965 patent states that the (z+1) factor may be replaced by the factor 2z. The use of the factor 2z advances the phase delay of the filer by wT/2 while the gain is almost unaffected, where T is the sampling period and w is the frequency. However, the amplitude response of a filter having a factor of 2z is much larger than the amplitude response of a filter having a factor of (z+1) at a higher frequency range. The differences in phase and the amplitude in the frequency responses are shown in FIG. 4 in which line 405 represents the amplitude response of a low pass filter having a factor of 2z in the numerator of the transfer function and line 410 represents the amplitude response of a low pass filter having a factor of (z+1) in the numerator of the transfer function. In FIG. 5, line 505 represents the phase response of a low pass filter having a factor of 2z in the numerator of the transfer function and line 510 represents the phase response of a low pass filter having a factor of (z+1) in the numerator of the transfer function.

Figure 6:
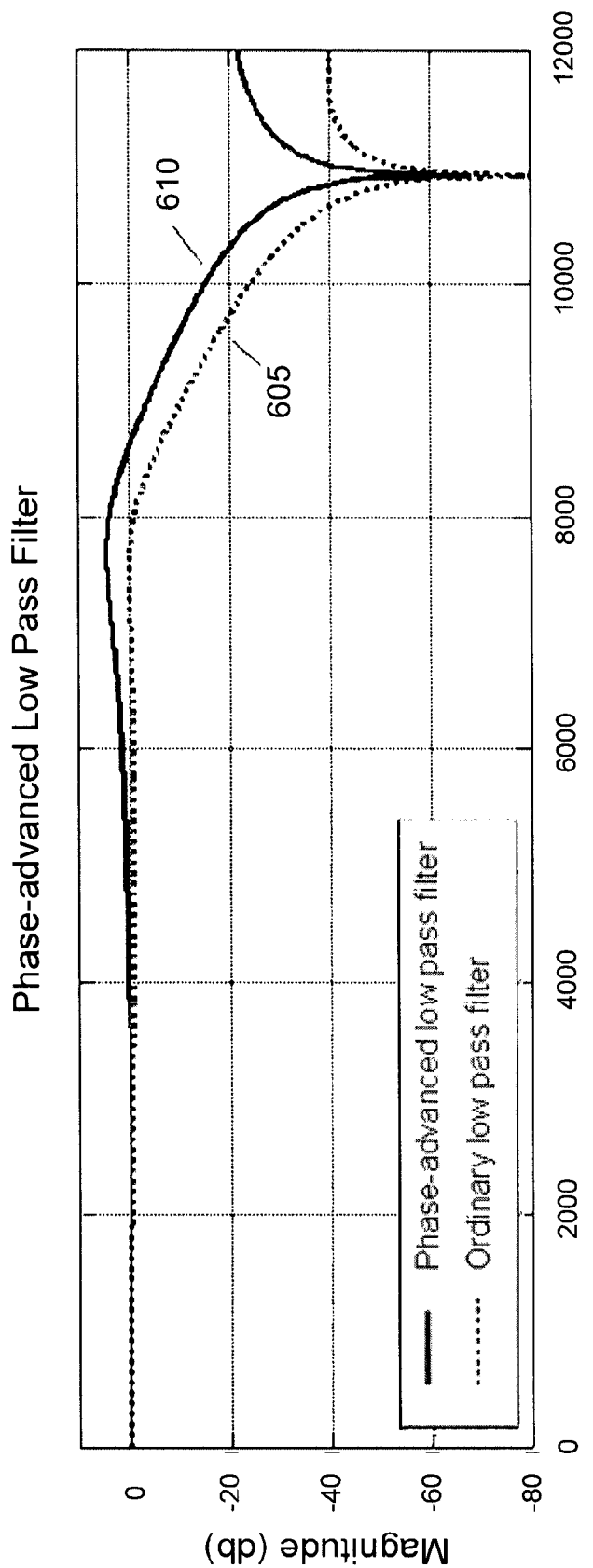
FIG. 6, illustrating a graph of the amplitude of frequency responses of two prior art low pass filters having (z+1) and 2z, respectively, as a factor in the numerator of the transfer function of the filter.
Figure 7:
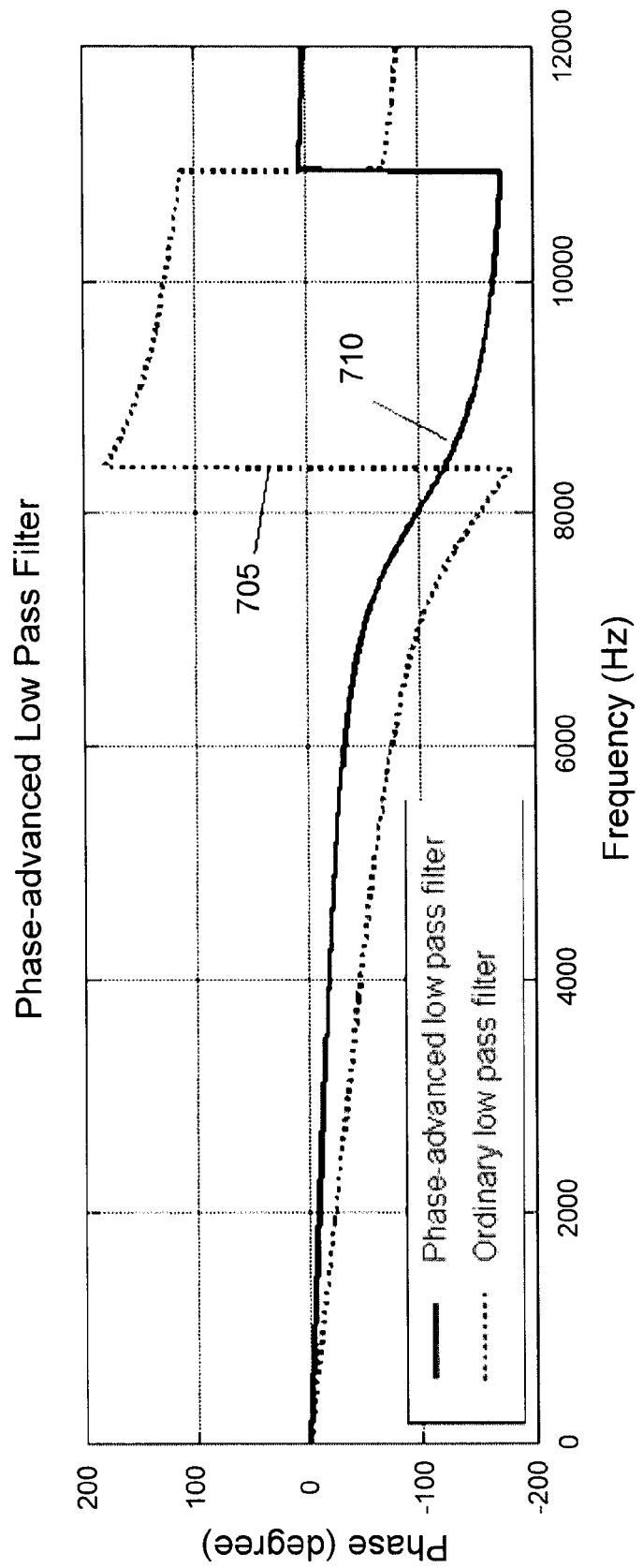
FIG. 7, illustrating the phase of frequency responses of an embodiment of first and second prior art low pass filters having (z+1) and 2z, respectively, as a factor in the numerator of the transfer function of the filter.

FIGS. 6 and 7 illustrate the amplitude and phase responses of a first ($3^{rd}$ order) low pass filter having a 8 kHz bandwidth and a transfer function with a factor of (z+1) in the numerator; and a second low pass filter having the same transfer function but with the factor of (z+1) replaced with 2z in the numerator. In FIG. 6, the amplitude response of the first low pass filter is represented by line 605 and the amplitude response of the second low pass filter is represented by line 610. FIG. 6 illustrates that the amplitude response of the second low pass filter is amplified from 3 kHz onwards. The phase response of the first and second filters is shown in FIG. 7. The phase response of the first low pass filter is represented by line 705 and the phase response of the second low pass filter is represented by line 710. As can be seen the phase loss of the second low pass filter is significantly less than the first low pass filter. Thus, it is preferable to use a low pass filter with a factor of 2z in the numerator of the transfer function. However, as will be shown below, it is a problem to handle unstable poles using such a low pass filter.

Figure 8:
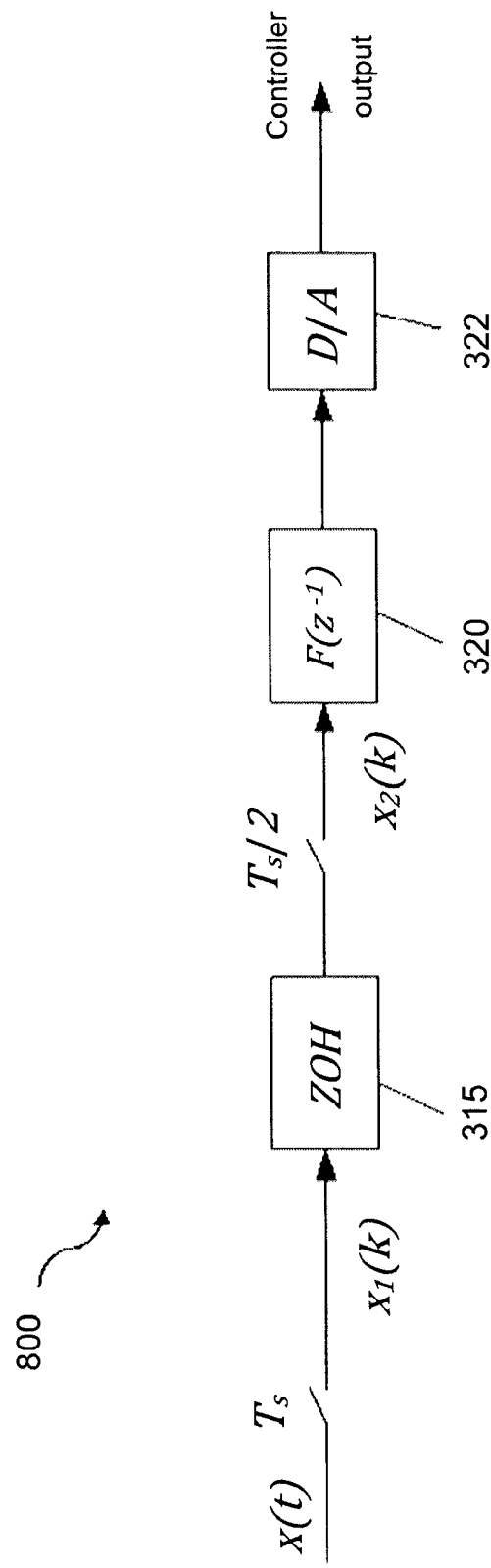
FIG. 8, illustrating a portion of the servo loop for generating the control signal in accordance with an embodiment of this invention.

In accordance with this invention, a multi-rate digital low pass filter is included in the servo loop to attenuate mechanical resonances. FIG. 8 illustrates a portion of servo loop 100 (shown in FIG. 1) that includes multi-rate digital low pass filter 320. Servo loop portion 800 includes zero-order-hold 315 that receives samples of signal x(t). A signal from zero-order-hold is applied to multi-rate digital low pass filter 320 that has a transfer function, $F(z^{-1})$, that may generally be expressed as:

$$\frac{b_0 + b_1 z + \ldots + b_m z^m}{a_0 + a_1 z + \ldots + a_n z^n} \left(\frac{2z}{1+z}\right)^l \quad (2)$$

where n−m>0; l≧1; and $a_0$ through $a_n$ and $b_0$ through $b_m$ are low pass filter constants that are dependent upon the system and are left as a design choice to those skilled in the art.

Figure 9:
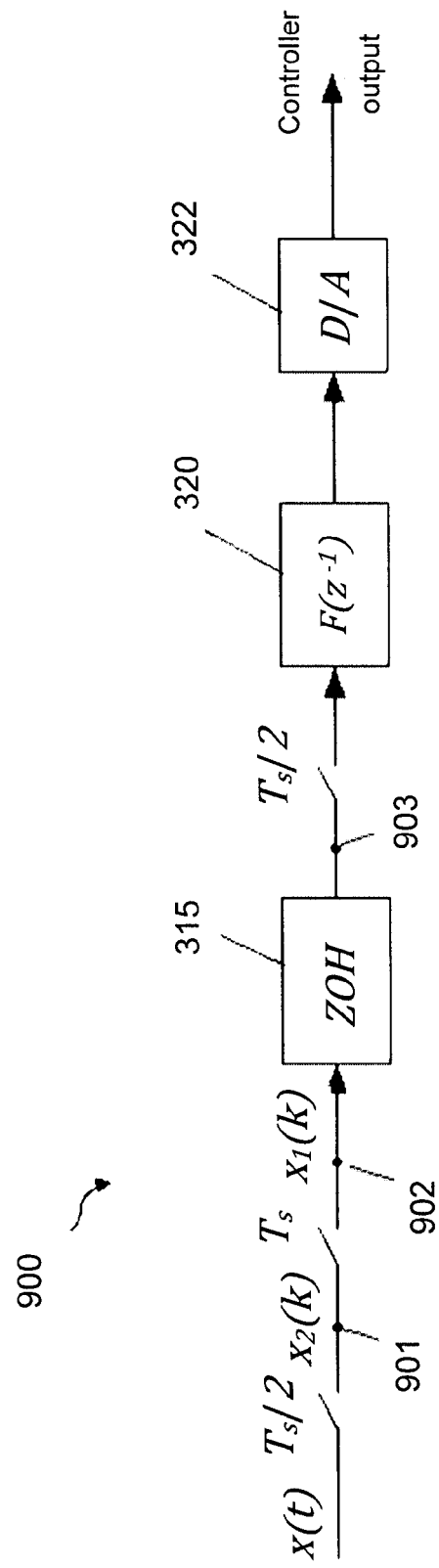
FIG. 9, illustrating an alternative illustration of the portion of the servo loop for generating the control signal shown in FIG. 8.

In FIG. 8, multi-rate low pass filter 320 has an updating rate that is two times faster than the sampling rate that is expressed as $T_s/2$. FIG. 9 provides an equivalent illustration of servo loop portion 800 of servo loop 300 by adding a fictitious sampler at a time interval of $T_s/2$ before the real sampler at a time interval of $T_s$. It is clear that this fictitious sampler does not affect the servo loop portion 800. The frequency spectrums of $x_1(k)$, $x_2(k)$ and x(t) are represented as $X_1(w)$, $X_2(w)$ and X(w). According to the sampling theorem the frequency spectrums $X_1(w)$ and $X_2(w)$ may be represented as:

$$X_1(w) = \frac{1}{T_s} \sum_{k=-\infty}^{\infty} X\left(w - j\frac{2\pi}{T_s}\right), \quad (3)$$

$$X_2(w) = \frac{2}{T_s} \sum_{k=-\infty}^{\infty} X\left(w - j\frac{4\pi}{T_s}\right)$$

The sampling frequency, $F_s$, equals $1/T_s$, is chosen such that in the spectrum the magnitude of the amplitude beyond the Nyquist Frequency is negligible. Thus, $X_1'(\omega) \approx X_2'(\omega)/2$ where $X_1'(\omega)$ and $X_2'(\omega)$) are the spectrums of $X_1(\omega)$ and $X_2(\omega)$ within the Nyquist frequency.

As shown in FIG. 9, $x_2(k)$ is determined at point 901 and $x_1(k)$ is determined at point 902 in servo loop portion 900. If the section of portion 900 between points 901 and 903 is removed, a system with a sampling period of $T_s/2$ is formed. The continuous transfer function from points 901 to 903 is described by $$G_{AB}(s) = \frac{1 - e^{-T_s}}{s}.$$

From the above equation (3) for the frequency spectrums we can determine the discrete transfer function as:

$$G_{AC}(z^{-1}) = Z_{T_s/2}\left(G_{AB}(s)\frac{1 - e^{-T_s}}{s}\right) \approx \frac{1 - z^{-2}}{2} Z_{T_s/2}\left(\frac{1}{s}\right) = \frac{1 + z^{-1}}{2} \quad (4)$$

where $Z_{T_s/2}$ denotes the z transform for the over-sampled system. Thus, a new multi-rate low pass filter, $F_{new}(z^{-1})$ may be designed as follows:

$$F_{new}(z^{-1}) = G_{AC}^{-1}(z^{-1})F(z^{-1}) \quad (5)$$

$$= \frac{2}{1 + z^{-1}} F(z^{-1})$$

where $$\frac{2}{1 + z^{-1}} \left(\text{or } \frac{2z}{1 + z}\right)$$

is called the phase-advanced factor. $F_{new}(z^{-1})$ may replace the original low pass filter, $F(z^{-1})$ and provide system performance that is approximate to the performance of a system sampled at a faster rate. However, $F_{new}(z^{-1})$ has an unstable pole $z=-1$ in the phase-advanced factor which makes the system unstable if the pole is not removed or handled properly.

Figure 10:
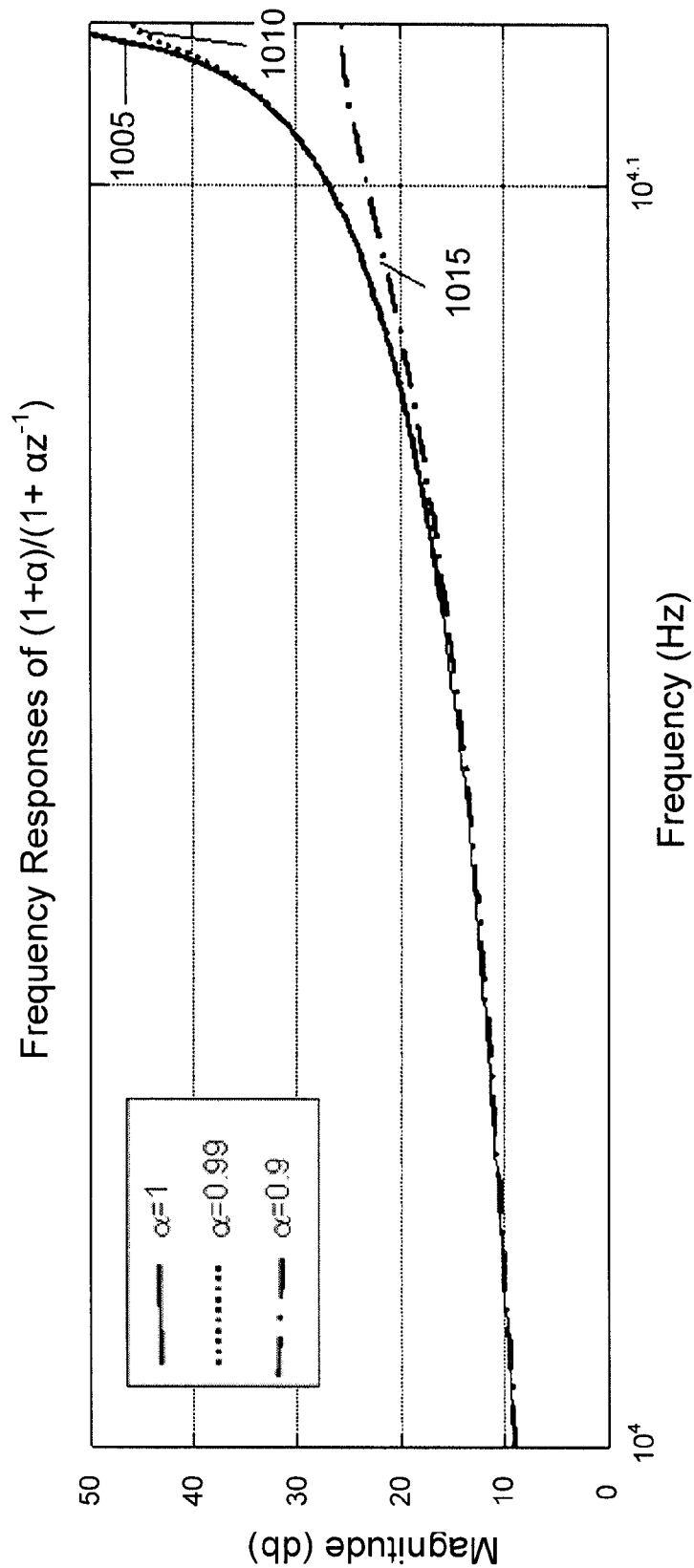
FIG. 10, illustrating a graph of the amplitude of frequency responses of a multi-rate digital low pass filter with a stable approximation of 2z/(z+1)
Figure 11:
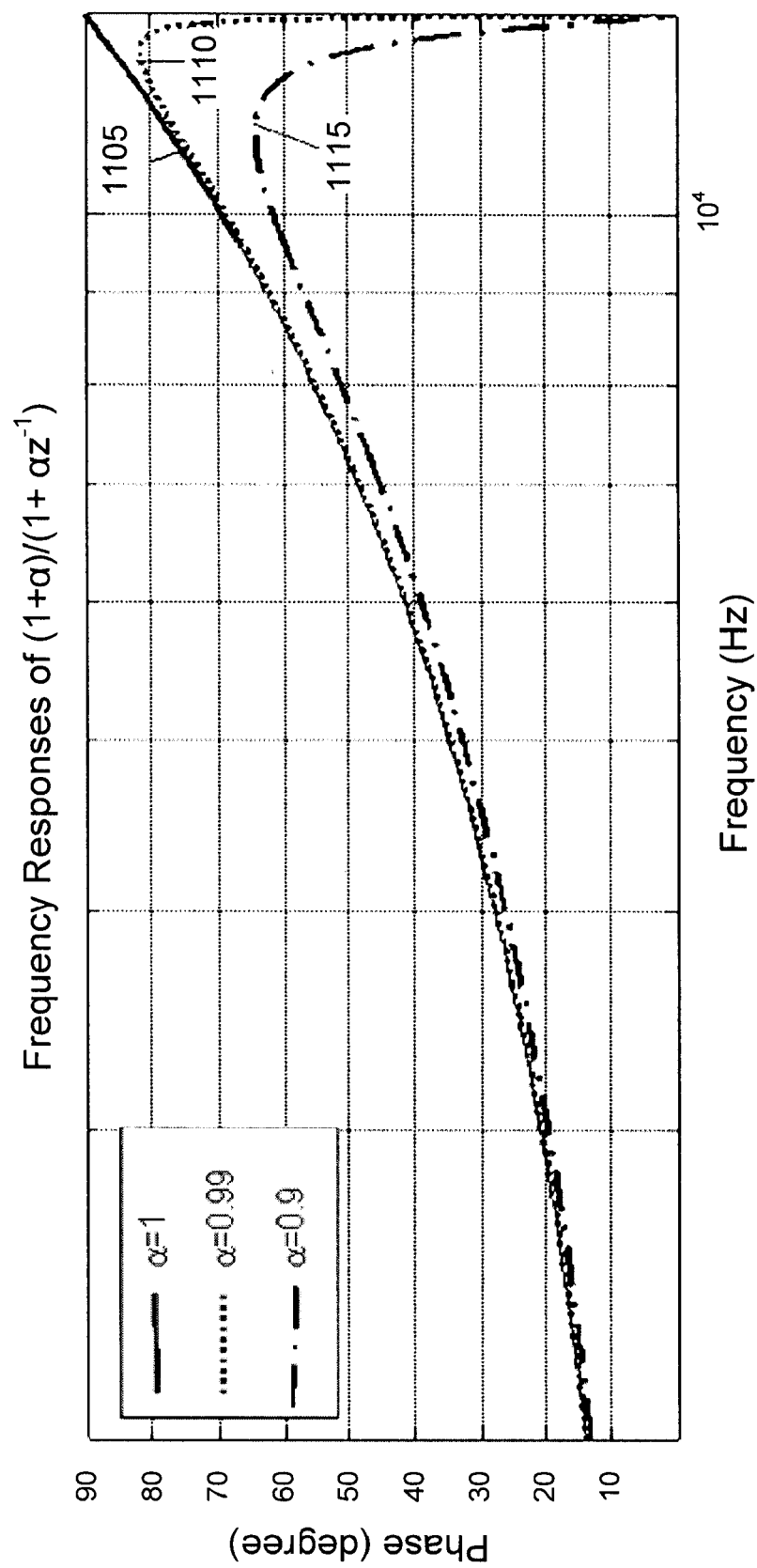
FIG. 11, illustrating a graph of the phase of frequency responses of a multi-rate digital low pass filter with a stable approximation of 2z/(z+1)

The factor $$\frac{2}{1 + z^{-1}}$$

as shown in equation (5) may be approximated with an approximation factor $$\frac{1 + \alpha}{1 + \alpha z^{-1}},$$

where $0 < \alpha \leq 1$. FIGS. 10 and 11 illustrate the graphs of the amplitude and phase of the frequency responses for a filter with an approximation factor $$\frac{1 + \alpha}{1 + \alpha z^{-1}}.$$

In FIG. 10, the amplitude of the frequency response for $\alpha=1$ is shown by line 1005, $\alpha=0.99$ is shown by line 1010, and $\alpha=0.9$ is shown by line 1015. When the amplitude of the frequency response in FIG. 10 is extended to 0 Hz, it will show that the magnitude response is approximately 0 dB for a large frequency range (not shown in FIG. 10). In FIG. 11, the phase of the frequency response for $\alpha=1$ is shown by line 1105, $\alpha=0.99$ is shown by line 1110, and $\alpha=0.9$ is shown by line 1115. In FIG. 11, each of the values of a has a phase advance property. From FIGS. 10 and 11, it can be seen that the amplitude of the frequency responses for different values of $\alpha$ are almost the same and there is no significant difference in the phase responses over a wide frequency range. Thus, $$\frac{1 + \alpha}{1 + \alpha z^{-1}}$$

is a good approximation for $$\frac{2}{1 + z^{-1}}$$

as $\alpha$ approaches 1. For more phase advance in an open loop response, multiples of $$\frac{1 + \alpha}{1 + \alpha z^{-1}}$$

may be applied. Thus, $F_{new}(z^{-1})$ of equation (5) may be modified as follows:

$$F_{new}(z^{-1}) = \left(\frac{1 + \alpha}{1 + \alpha z^{-1}}\right)^l F(z^{-1}) \quad (6)$$

where $l \geq 1$ and l is an integer that may be determined by the desired phase at the crossover frequency in the open loop response.

The following is an example of using the described low pass filter to attenuate high frequency mechanical resonances in accordance with this invention. It is known that analog low pass filters, such as Butterworth low pass filters, have more poles than zeros. Thus, a digital equivalent of a Butterworth low pass filter has at least one zero at $z=-1$. This can be verified by applying a bi-linear transformation, $$s = \frac{2}{T_s} * \frac{1 - z^{-1}}{1 + z^{-1}},$$

to the filter to digitize the analog filter. In this scenario, the multi-rate control technique of $F_{new}(z^{-1})$ can be directly applied as the unstable pole at $z=-1$ is canceled by a zero at $z=-1$ in the filter. Thus, a multi-rate digital low pass filter having a transfer function of $F_{new}(z^{-1})$ with a bandwidth that is carefully selected according to the range of mechanical resonances to be attenuated may be used to compensate for the phase loss and improve the stability margin in the control system.

However, it is not always the case that the transfer function is designed to have a zero at $z=-1$ to cancel out the unwanted pole. For example, well known Elliptic filters usually do not have a zero at z=−1. In such cases, an approximation of $F_{new}(z^{-1})$, namely $$F_{new}(z^{-1}) = \left(\frac{1+\alpha}{1+\alpha z^{-1}}\right)^l F(z^{-1})$$

as described in equation (6), is necessary to keep system stability.

Figure 12:
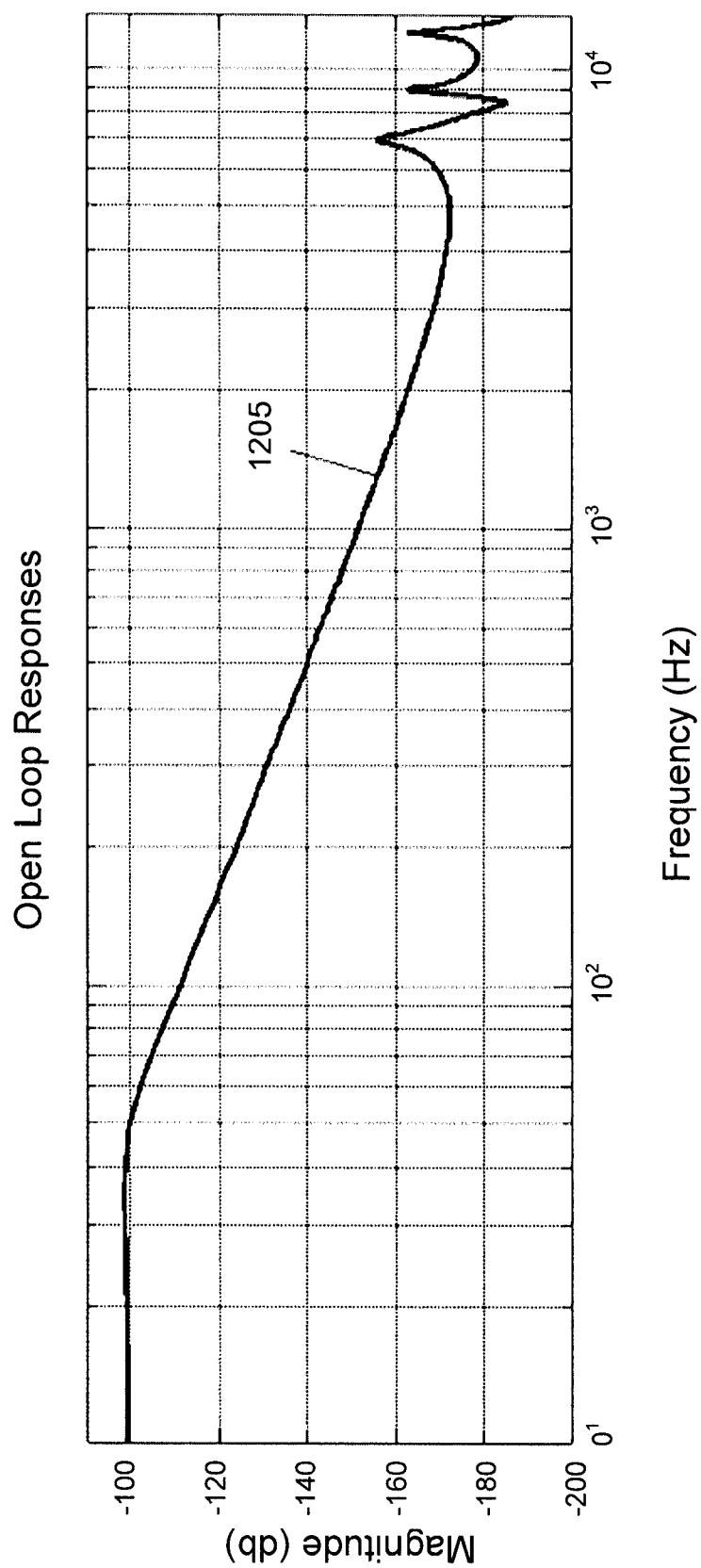
FIG. 12, illustrating a graph of the amplitude of frequency responses a plant.
Figure 13:
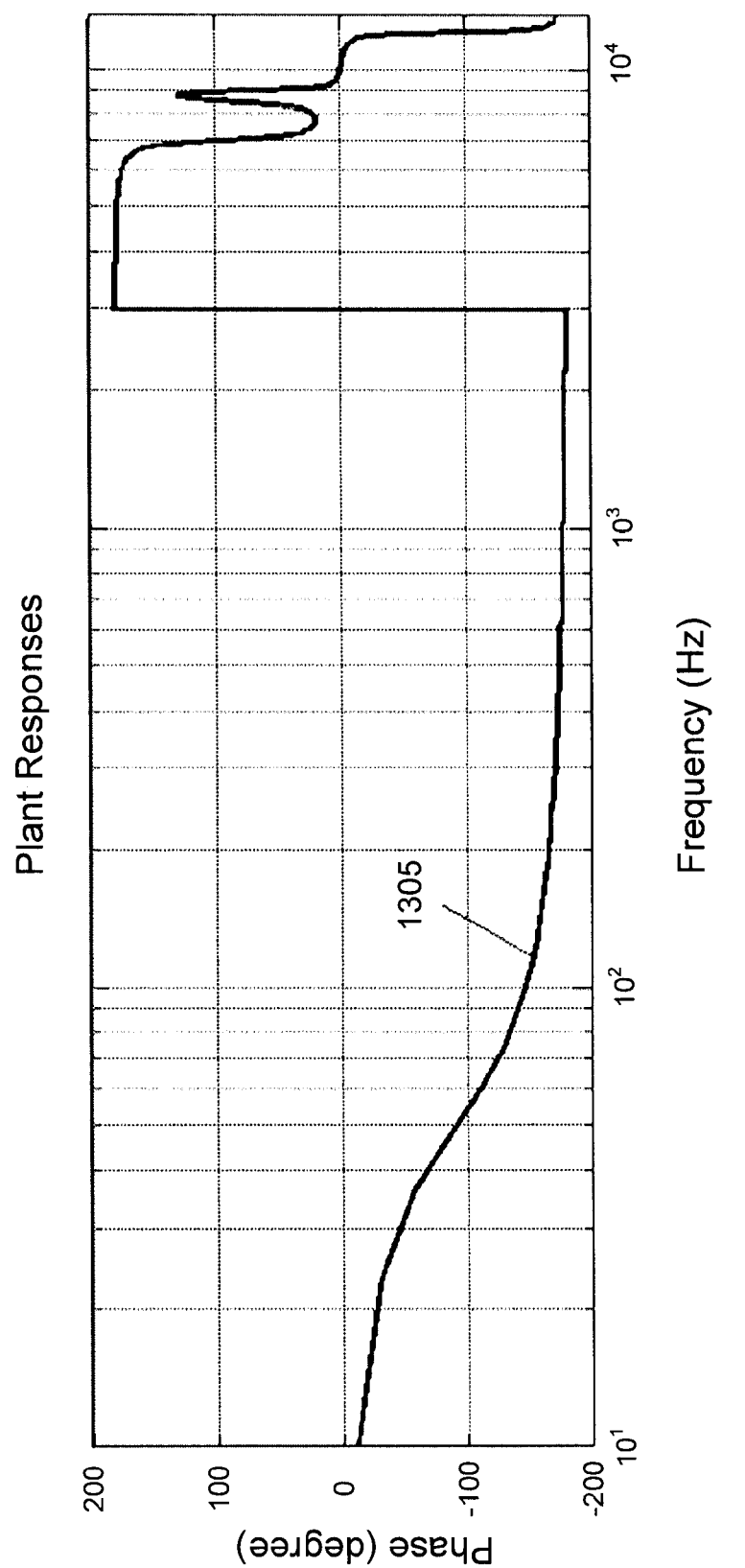
FIG. 13, illustrating a graph of the phase of frequency responses of a plant.

FIGS. 12 and 13 illustrate the amplitude and phase of the frequency responses of a plant. The plant used to generate FIGS. 12 and 13 has 3 resonance modes (peaks) at 7 kHz, 9 kHz, and 12 kHz. The digital controller that generates the control signal for the plant has a servo bandwidth of 1.4 kHz. The sampling period of the signal is 38.575 µs. As can be seen from FIG. 12, the amplitude of the frequency response, shown by line 1205, is approximately −100 dB from 100 Hz to about 500 Hz, and sharply decreases after 500 Hz. The phase of the frequency response, illustrated in FIG. 13, is approximately 0 dB from 100 Hz to 200 Hz and then drops significantly as shown by line 1305. The 3 resonance modes as shown in FIG. 12 will be dealt with in the following using the traditional notch filters and the multi-rate low pass filter in accordance with this invention.

Figure 14:
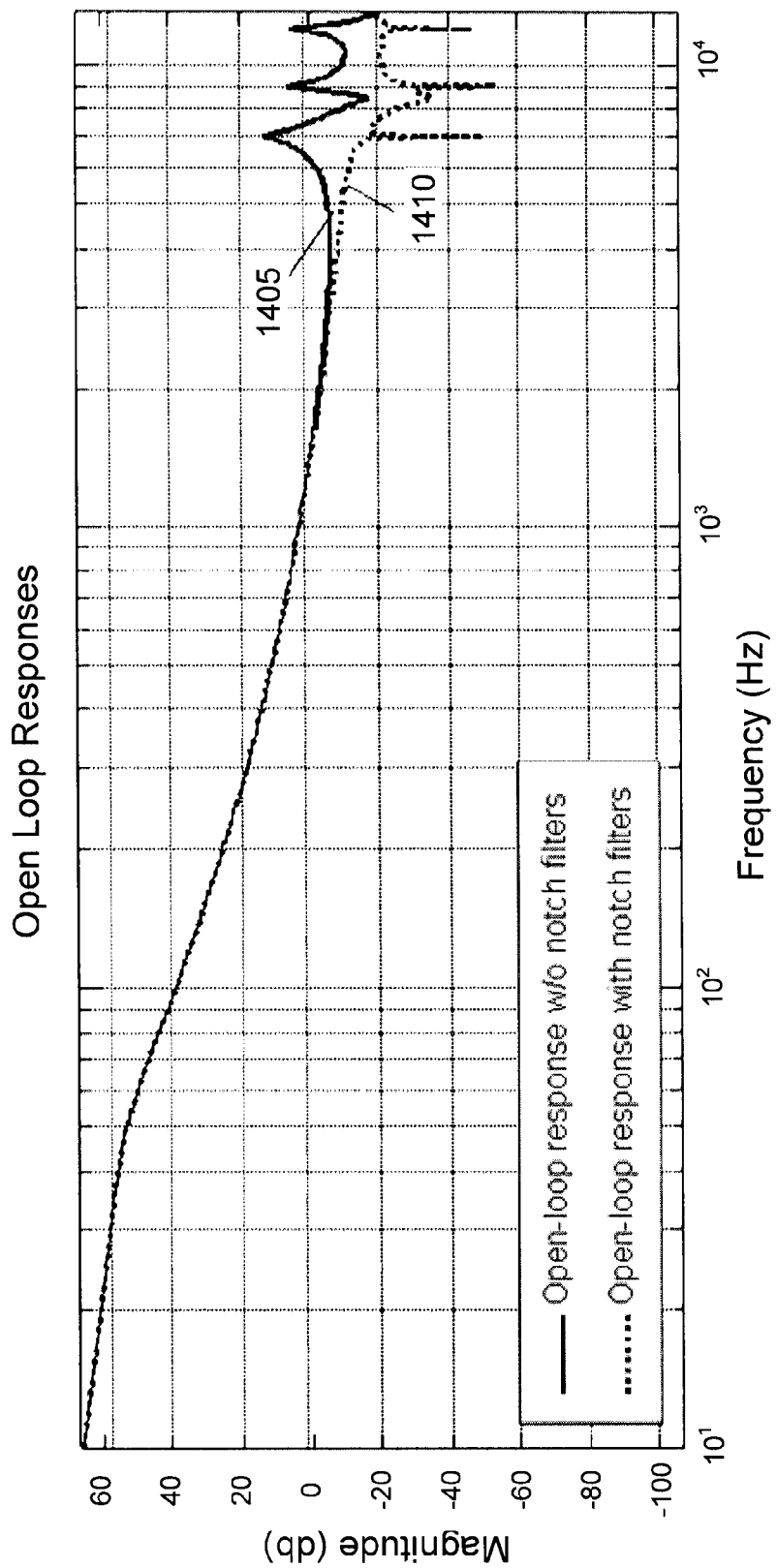
FIG. 14, illustrating a graph of the amplitude of frequency responses of an open loop system with and without the use of notch filters to attenuate the resonance frequencies in a plant.
Figure 15:
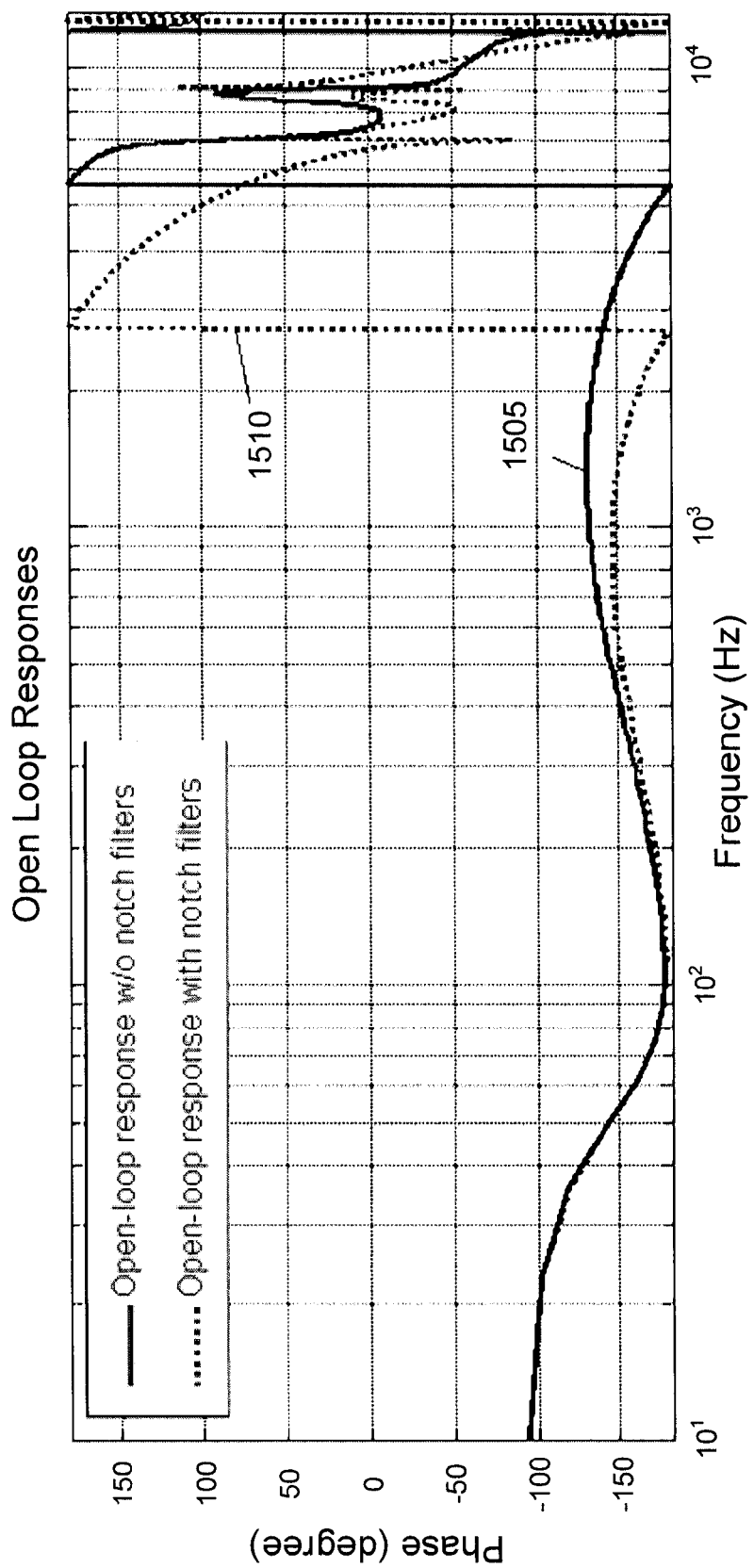
FIG. 15, illustrating a graph of the phase of frequency responses of an open loop system with and without the use of notch filters to attenuate the resonance frequencies in a plant.

FIGS. 14 and 15 illustrate frequency responses of an open loop system in which notch filters are used to attenuate the resonance frequencies in the plant discussed above. For FIGS. 14 and 15, 3 notch filters having a 30 dB depth and 500 Hz bandwidth are designed to attenuate the resonances at 7 kHz, 9 kHz, and 12 kHz. In FIG. 14, the amplitude of the frequency response of an open loop system without the notch filters is shown by line 1405 and the amplitude of the frequency response with notch filters is shown by line 1410. In FIG. 15, the phase of the frequency response of an open loop system without the notch filters is shown by line 1505 and the phase of the frequency response with notch filters is shown by line 1510. From FIG. 15, it can be seen that the phase loss due to the notch filters is approximately 20.8 degrees and the phase margin is 27.4 degrees.

Figure 16:
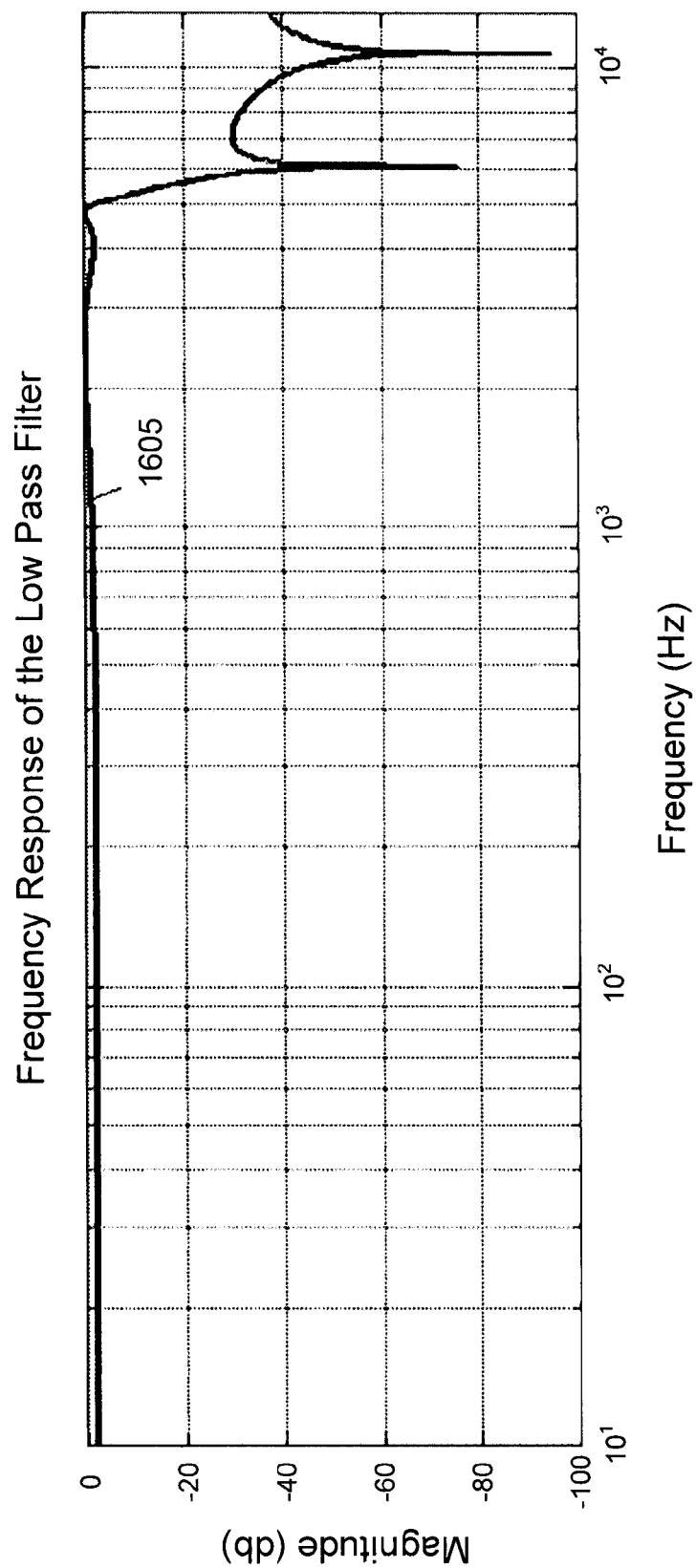
FIG. 16, illustrating a graph of the amplitude of frequency responses of a low pass filter in accordance with the prior art.
Figure 17:
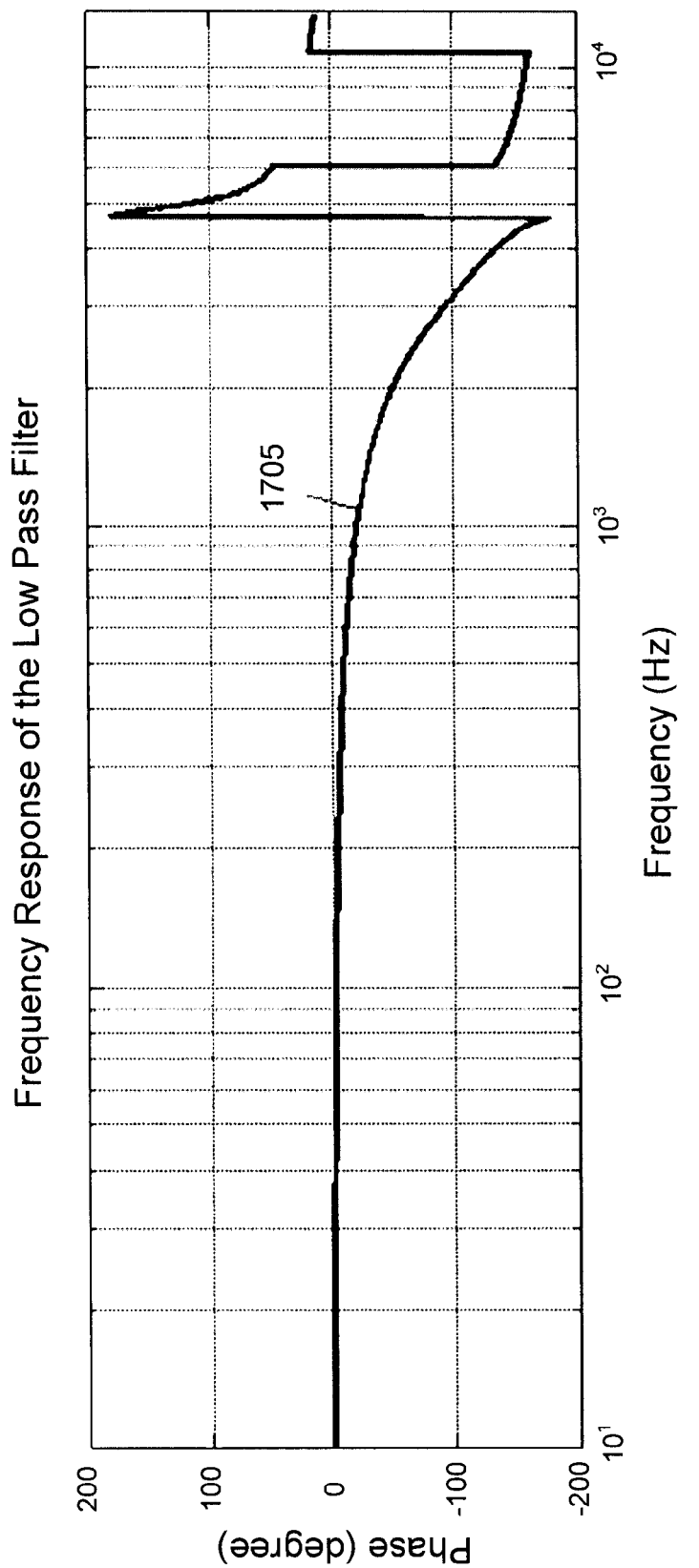
FIG. 17, illustrating a graph of the phase of frequency responses of a low pass filter in accordance with the prior art.

FIGS. 16 and 17 show graphs of frequency responses of a low pass filter designed in accordance with the prior art. In this embodiment, the low pass filter is designed to handle the resonances at 7 kHz, 9 kHz, and 12 kHz. To handle these resonances, a fourth order multi-rate elliptical low pass filter with a 5 kHz cut-off frequency is designed having the following transfer function:

$$F(z^{-1}) = \frac{0.04085 - 0.08592z^{-1} + 0.1183z^{-2} - 0.08592z^{-3} + 0.04085z^{-4}}{1 - 3.217z^{-1} + 4.233z^{-2} - 2.644z^{-3} + 0.6638z^{-4}} \quad (7)$$

This filter does not have a zero at z=−1 to cancel the unstable pole in equation (5). Therefore, this filter is not suitable be used directly in the multi-rate digital low pass filter as described by equation (5). The amplitude of the frequency response of this filter is shown by line 1605 in FIG. 16 and the phase of the frequency response is shown by line 1705 in FIG. 17. From FIG. 17, it can be seen that the phase drop of the filter at 1.5 kHz is approximately 34.5 degrees. This is an unacceptable amount of phase loss. Thus, the filter requires phase compensation to be viable. Furthermore, as the filter does not include a zero at z=−1, the filter requires a method for handling a pole at z=−1.

Figure 18:
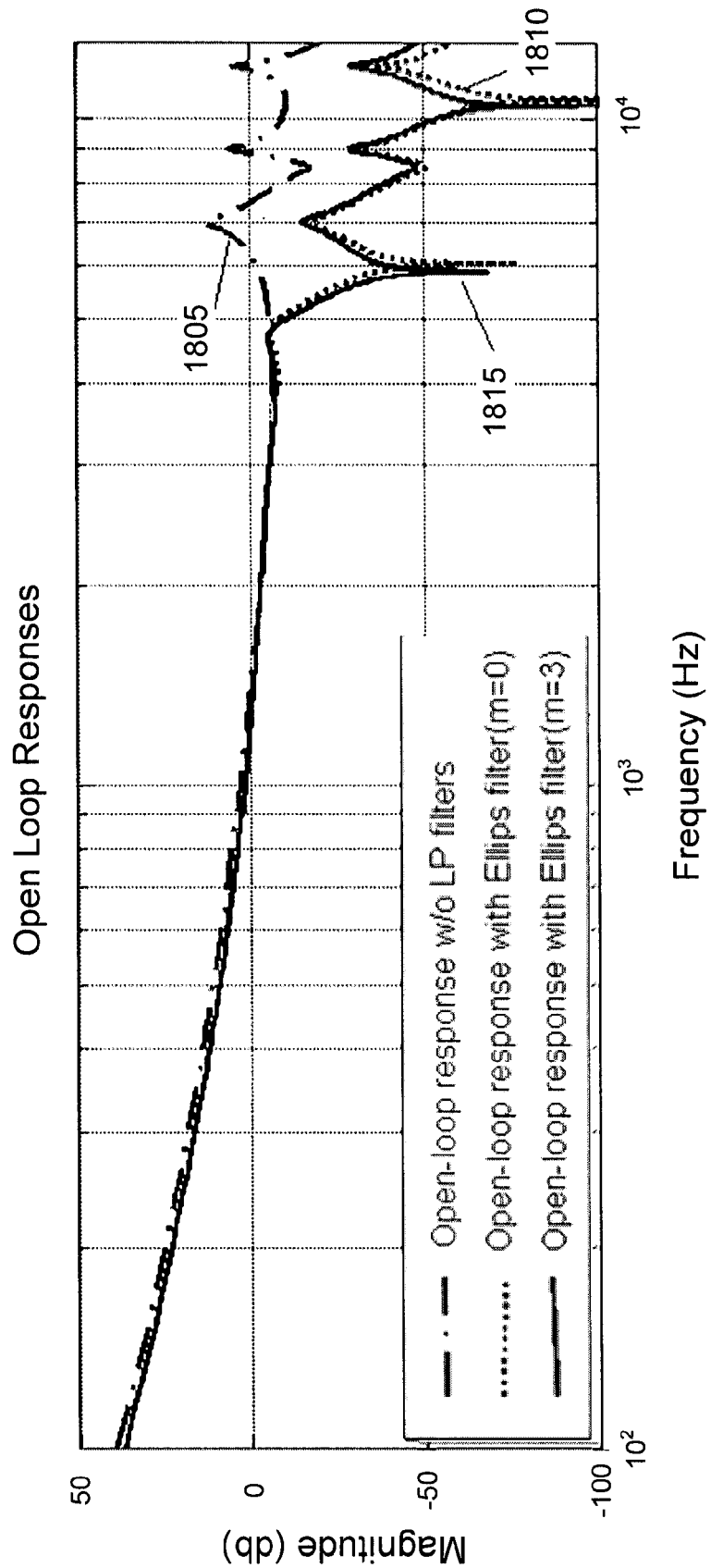
FIG. 18, illustrating a graph of the amplitude of frequency responses of a low pass filter in accordance with this invention.
Figure 19:
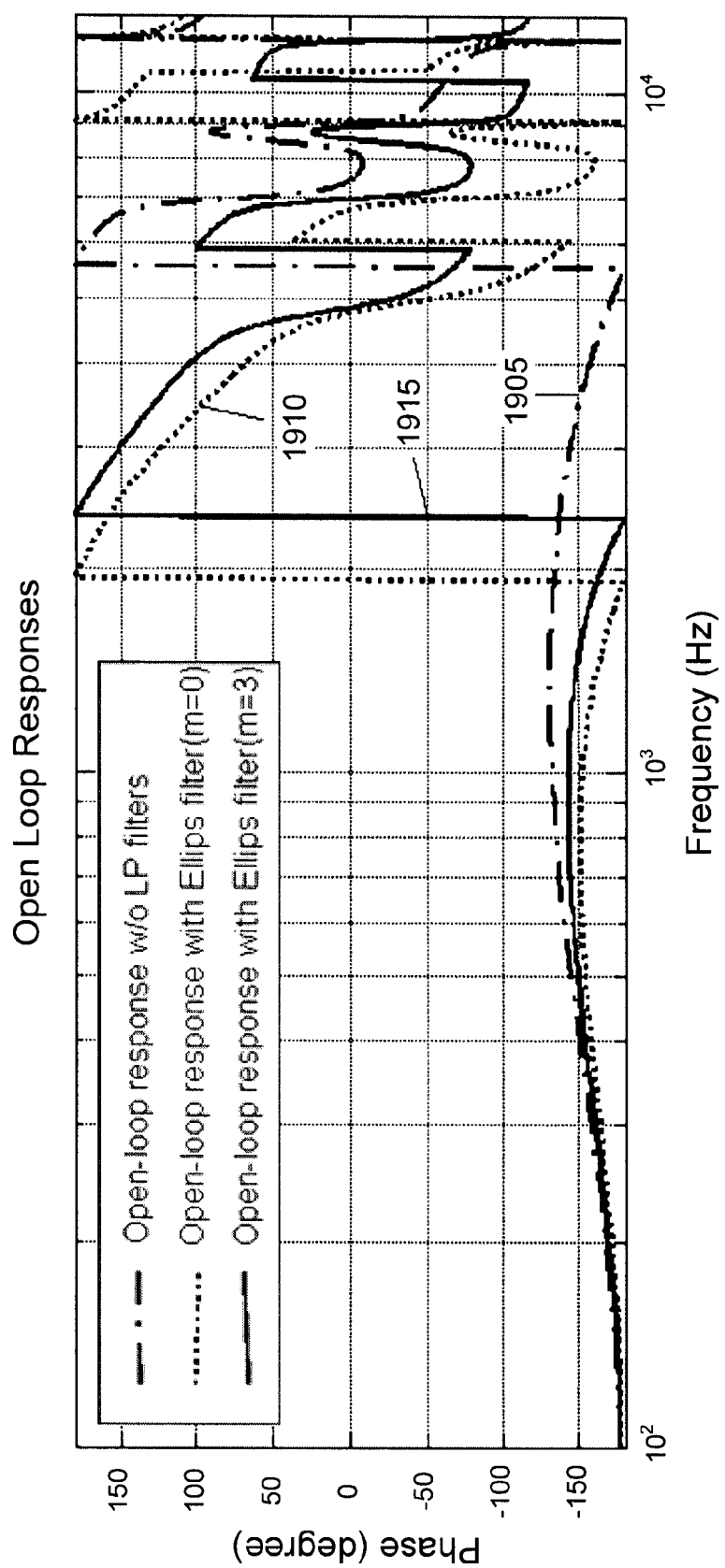
FIG. 19, illustrating a graph of the phase of frequency responses of a low pass filter in accordance with this invention.

To handle the non-zero at z=−1 and to provide phase compensation, an approximation of the phase advance term of $$\left(\frac{1+\alpha}{z+\alpha}z\right)^l$$

is used, as described in equation (6). FIGS. 18 and 19 illustrates the graphs of the amplitude and phase of frequency responses of an open loop system without a low pass filter and with a low pass filters in accordance with this invention with l=0, 1, and 3. In FIG. 18, the magnitude of the amplitude of the frequency response when open loop system does not include a low pass filter is shown by line 1805; the magnitude of the amplitude of the frequency response for an open loop system with a low pass filter with l=0 is shown by line 1810; and the magnitude of the amplitude of the frequency response for an open loop system with a low pass filter when l=3 is shown by line 1815. In FIG. 19, the phase of the frequency response when the open loop system does not include a low pass filter is shown by line 1905; the phase of the frequency response for an open loop system with a low pass filter with l=0 is shown by line 1910; and the phase of the frequency response for an open loop system with a low pass filter when l=3 is shown by line 1915. From FIGS. 18 and 19, it can be seen that the elliptical low pass filter has attenuated the high frequency resonances and the phase margins are comparable to a notch filter as l increases to 3. The following table shows the phase margins in different cases:

|  | Notch Filter | Elliptic Low-Pass Filter | | |
| --- | --- | --- | --- | --- |
|  |  | l = 0 | l = 1 | l = 2 |
| Phase(degree) | 27.4 | 23.6 | 25.00 | 27.90 |

From the table, it can be seen the phase margin of the low pass filter is comparable to the notch filter when l=2 and that the term $$\left(\frac{1+\alpha}{z+\alpha}z\right)^l$$

had little effect on the magnitude of the open loop frequency responses.

Those skilled in the art will recognize the above provides a description of low pass filter that may be used to attenuate high frequency mechanical resonances in accordance with this invention. It is envisioned that those skilled in the art can and will design alternative embodiments that infringe on this invention as set forth in the following claims either literally or through the Doctrine of Equivalents.

What is claimed is:

1. A control system for providing a control signal for a plant, said control system comprising:
   a digital signal processor that generates a control signal based upon a sample of a previously output control signal; and
   a multi-rate digital low pass filter provided by said digital signal processor that attenuates high resonance frequencies from said control signal, wherein said multi-rate digital low pass filter has a transfer function having a low pass filtering function and a phase-advanced factor having an unstable pole at z=−1, wherein said transfer function includes one selected from the group consisting of said low pass filtering function that cancels said unstable pole and an approximation of said phase-advanced factor that avoids said unstable pole.

2. The control system of claim 1, wherein said phase-advanced factor is $$\left(\frac{2z}{z+1}\right)^l$$

where $l \geq 1$ and said unstable pole at z=−1 in said phase-advanced factor is canceled by a zero at z=−1 in said low pass filtering function.

3. The control system of claim 1, wherein said approximation of said phase-advanced factor avoids said unstable pole at z=−1 when a zero at z=−1 is not present in said low pass filtering function.

4. The control system of claim 3, wherein said approximation is $$\left(\frac{1+\alpha}{z+\alpha}z\right)^l,$$

where $l \geq 1$ and $0 < \alpha \leq 1$.

5. The control system of claim 1, wherein said transfer function comprises:

$$\frac{b_0 + b_1 z^1 + \ldots + b_m z^m}{a_0 + a_1 z^1 + \ldots + a_n z^n}\left(\frac{2z}{1+z}\right)^l$$

wherein n−m>0; $l \geq 1$; and $a_0$ through $a_n$ and $b_0$ through $b_m$ are low pass filter constants.

6. The control system of claim 1, further comprising:
a feedback loop for providing said previously output control signal to said multi-rate digital low pass filter; and
an analog-to-digital converter for converting said previously output control signal into a digital previously output control signal that is received by said digital signal processor.

7. The control system of claim 1, further comprising:
a digital-to-analog converter for converting a control signal generated by said digital signal processor to an analog control signal applied to said plant.

8. A method for removing high resonance frequencies from a control signal, said method comprising:
generating a control signal in a digital signal processor;
applying said control signal to a multi-rate digital low pass filter to attenuate high resonance frequencies from said control signal, wherein said multi-rate digital low pass filter has a transfer function having a low pass filtering function and a phase-advanced factor having an unstable pole at z=−1, and wherein said transfer function includes one selected from the group consisting of said low pass filtering function that cancels said unstable pole and an approximation of said phase-advanced factor that avoids said unstable pole.

9. The method of claim 8, wherein said low pass filtering function provides a zero at z=−1 in said low pass filtering function to cancel said unstable pole at z=−1.

10. The method of claim 8, wherein said approximation is $$\left(\frac{1+\alpha}{z+\alpha}z\right)^l$$

where $l \geq 1$ and $0 < \alpha \leq 1$.

11. The method of claim 8, wherein said transfer function of said multi-rate digital low pass filter comprises:

$$\frac{b_0 + b_1 z^1 + \ldots + b_m z^m}{a_0 + a_1 z^1 + \ldots + a_n z^n}\left(\frac{2z}{1+z}\right)^l$$

where n−m>0; $l \geq 1$; and $a_0$ through $a_n$ and $b_0$ through $b_m$ are low pass filter constants.

12. The method of claim 8, wherein said multi-rate digital low pass filter advances the phase of said control signal by multiplying said low pass filtering function with said phase-advanced factor of $$\left(\frac{2z}{z+1}\right)^l$$

where $l \geq 1$ when a zero at z=−1 is present in said low pass filtering function.

13. The method of claim 8, wherein said multi-rate digital low pass filter advances the phase of said control signal by multiplying said low pass filtering function with said approximation of $$\left(\frac{1+\alpha}{z+\alpha}z\right)^l,$$

wherein $l \geq 1$ and $0 < \alpha \leq 1$, when a zero at z=−1 is not present in said low pass filtering function.

\* \* \* \* \*